US008800977B2

(12) United States Patent
Kolb

(10) Patent No.: US 8,800,977 B2
(45) Date of Patent: Aug. 12, 2014

(54) SUSPENSION DEVICE FOR VEHICLE SEATS AND/OR VEHICLE CABINS HAVING AN ELASTOMER MEMBER

(75) Inventor: Jens Kolb, Koenigstein (DE)

(73) Assignee: Grammer AG (DE)

( * ) Notice: Subject to any disclaimer, the term of this patent is extended or adjusted under 35 U.S.C. 154(b) by 26 days.

(21) Appl. No.: 13/316,714

(22) Filed: Dec. 12, 2011

(65) Prior Publication Data

US 2012/0153551 A1    Jun. 21, 2012

(30) Foreign Application Priority Data

Dec. 15, 2010 (DE) .......................... 10 2010 054 749

(51) Int. Cl.
*A47C 7/14* (2006.01)
*B60N 2/54* (2006.01)
*B60N 2/50* (2006.01)
*B60G 99/00* (2010.01)

(52) U.S. Cl.
CPC ............... *B60N 2/542* (2013.01); *B60N 2/502* (2013.01); *B60G 99/004* (2013.01); *B60G 99/002* (2013.01)
USPC ..... 267/131; 267/140.4; 267/160; 297/216.1; 297/216.15; 297/216.16; 297/216.18

(58) Field of Classification Search
CPC .... B60G 99/002; B60G 99/004; B60N 2/502; B60N 2/542
USPC .......... 267/131, 136, 140.3, 140.4, 140.5, 30, 267/133, 160, 158, 269, 37.1, 37.2, 292, 267/294, 47, 140.11, 141; 297/216.1, 297/216.15, 216.16, 216.17, 216.18
See application file for complete search history.

(56) References Cited

U.S. PATENT DOCUMENTS

| 203,739 | A | * | 5/1878 | Kilburn .......................... 267/133 |
| 1,544,248 | A | | 6/1925 | Liebl |
| 1,607,164 | A | * | 11/1926 | Leipert et al. ................... 267/30 |
| 1,945,801 | A | * | 2/1934 | Briggs .......................... 267/37.1 |
| 1,948,476 | A | * | 2/1934 | Curt ............................. 267/141 |

(Continued)

FOREIGN PATENT DOCUMENTS

| DE | 1480465 | 1/1970 |
| DE | 1405350 | 3/1970 |

(Continued)

OTHER PUBLICATIONS

Extended European Search Report for European Patent Application No. 11193615.9, mailed on Apr. 25, 2012, 3 pages.

(Continued)

*Primary Examiner* — Robert A Siconolfi
*Assistant Examiner* — Charles Poon
(74) *Attorney, Agent, or Firm* — Sheridan Ross P.C.

(57) ABSTRACT

The invention relates to a suspension device for vehicle seats and/or vehicle cabins for applying a spring force to a vibratory motion of a first component relative to a second component, preferably in the longitudinal and/or transverse direction of the vehicle, wherein at least one elongate spring member extending at least in the longitudinal and/or transverse direction of the vehicle is connected in at least one end region to the first component and in the central region thereof to the second component, wherein the elongate spring member is made from a flexible elastomer material that is formed to be rod-shaped.

10 Claims, 6 Drawing Sheets

(56) References Cited

U.S. PATENT DOCUMENTS

Figure 1:
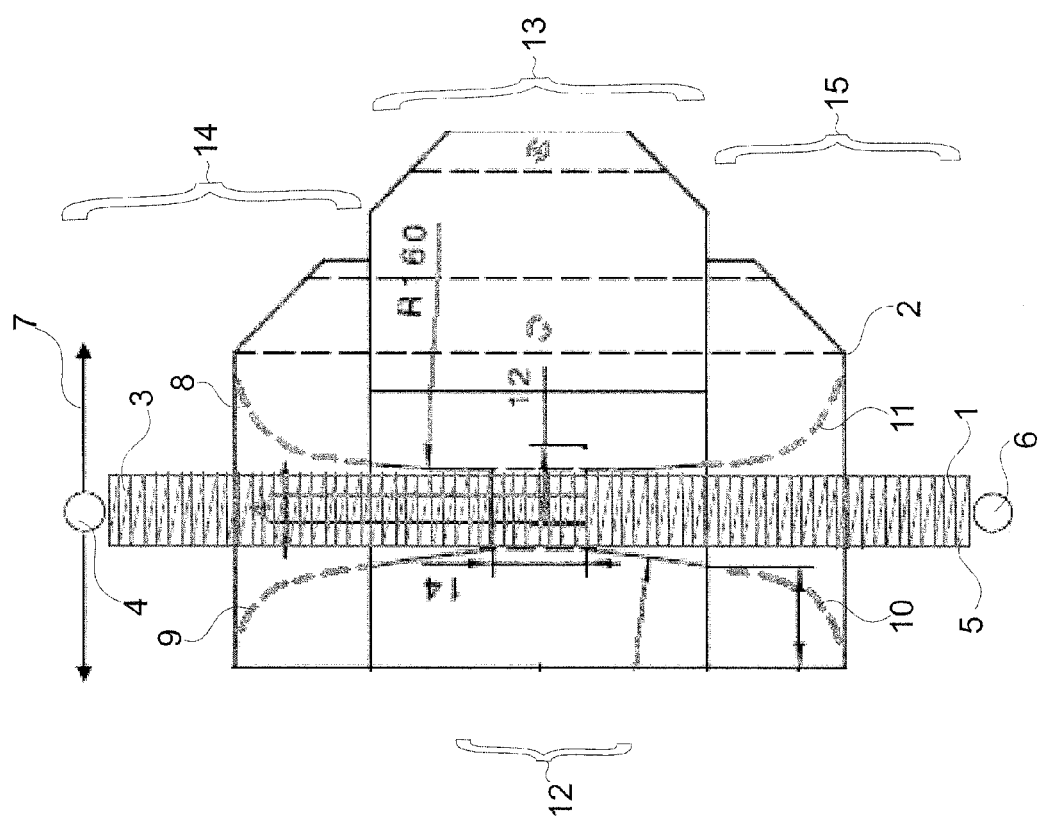

| | | |
|---|---|---|
| 2,489,981 A | 3/1946 | Rose |
| 2,559,105 A * | 7/1951 | Banning, Jr. .................. 267/47 |
| 2,607,397 A | 8/1952 | Schneider |
| 2,686,667 A * | 8/1954 | Willison et al. .............. 267/153 |
| 2,933,127 A | 4/1960 | Brewster |
| 3,046,053 A | 7/1962 | Pearlstine |
| 3,134,568 A | 5/1964 | Carson |
| 3,208,085 A | 9/1965 | Grimshaw |
| 3,298,654 A | 1/1967 | Dome |
| 3,436,042 A | 4/1969 | Van Goubergen |
| 3,578,376 A | 5/1971 | Hasegawa et al. |
| 3,608,855 A | 9/1971 | Osenberg |
| 3,697,128 A | 10/1972 | Strien et al. |
| 3,724,603 A | 4/1973 | Shiomi et al. |
| 3,756,556 A * | 9/1973 | Georgi ............................ 251/7 |
| 3,788,697 A | 1/1974 | Barton et al. |
| 3,802,737 A | 4/1974 | Mertens |
| 3,847,338 A | 11/1974 | Adams |
| 3,882,956 A | 5/1975 | Plegat |
| 3,883,172 A | 5/1975 | Barton et al. |
| 3,917,209 A | 11/1975 | Adams |
| 4,002,315 A | 1/1977 | Van Goubergen |
| 4,022,411 A | 5/1977 | Rumsey |
| 4,183,492 A | 1/1980 | Meiller |
| 4,257,626 A | 3/1981 | Adomeit |
| 4,273,213 A | 6/1981 | Munz |
| 4,349,167 A | 9/1982 | Reilly |
| 4,440,441 A | 4/1984 | Marrujo et al. |
| 4,487,383 A | 12/1984 | Mazelsky |
| 4,500,076 A | 2/1985 | Rova |
| 4,519,591 A * | 5/1985 | Bush et al. ................... 267/148 |
| 4,529,158 A | 7/1985 | Sautter, Jr. |
| 4,678,155 A | 7/1987 | Carter |
| 4,679,760 A | 7/1987 | Dotzler et al. |
| 4,714,227 A | 12/1987 | Holm et al. |
| 4,842,257 A | 6/1989 | Abu-Isa et al. |
| 4,859,148 A * | 8/1989 | Hibyan ...................... 416/134 A |
| 4,911,381 A | 3/1990 | Cannon et al. |
| 4,927,119 A | 5/1990 | Frost |
| 4,954,051 A | 9/1990 | Smith et al. |
| 4,958,812 A * | 9/1990 | Wolf et al. ................... 267/294 |
| 5,004,206 A | 4/1991 | Anderson |
| 5,014,960 A | 5/1991 | Kimura |
| 5,054,753 A | 10/1991 | Polus |
| 5,087,503 A * | 2/1992 | Meatto ......................... 428/162 |
| 5,123,625 A | 6/1992 | Spaltofski |
| 5,127,699 A | 7/1992 | Maezawa et al. |
| 5,194,111 A * | 3/1993 | Meatto ......................... 156/166 |
| 5,221,071 A | 6/1993 | Hill |
| 5,222,709 A | 6/1993 | Culley, Jr. et al. |
| 5,331,750 A | 7/1994 | Sasaki et al. |
| 5,338,090 A | 8/1994 | Simpson et al. |
| 5,344,210 A | 9/1994 | Marwan et al. |
| 5,358,210 A * | 10/1994 | Simon et al. ................. 248/628 |
| 5,368,118 A | 11/1994 | Hoefle |
| 5,437,494 A | 8/1995 | Beauvais |
| 5,449,218 A | 9/1995 | Beauvais et al. |
| 5,553,911 A | 9/1996 | Bodin et al. |
| 5,555,501 A | 9/1996 | Furihata et al. |
| 5,632,208 A * | 5/1997 | Weber ......................... 105/182.1 |
| 5,651,585 A | 7/1997 | Van Duser |
| 5,657,950 A | 8/1997 | Han et al. |
| 5,730,492 A | 3/1998 | Warrick et al. |
| 5,743,592 A | 4/1998 | Bedouch |
| 5,871,257 A | 2/1999 | Dundes, Sr. |
| 5,899,288 A | 5/1999 | Schubert et al. |
| 5,967,604 A | 10/1999 | Yoshida |
| 6,286,821 B1 * | 9/2001 | Schaffer ....................... 267/141.4 |
| 6,354,556 B1 | 3/2002 | Ritchie et al. |
| 6,412,864 B1 | 7/2002 | Larson |
| 6,478,102 B1 | 11/2002 | Puterbaugh et al. |
| 6,725,983 B2 | 4/2004 | Bell |
| 6,758,294 B2 | 7/2004 | Peddycord et al. |
| 6,773,049 B2 | 8/2004 | Rupiper et al. |
| 6,857,674 B2 | 2/2005 | Chareyre |
| 7,017,888 B2 * | 3/2006 | Platner et al. ................. 267/36.1 |
| 7,044,553 B2 | 5/2006 | Ropp |
| 7,077,226 B2 | 7/2006 | Oliver et al. |
| 7,077,227 B2 | 7/2006 | Oliver et al. |
| 7,080,881 B2 | 7/2006 | Williamson et al. |
| 7,201,367 B2 * | 4/2007 | Wietharn ...................... 267/141 |
| 7,240,754 B2 | 7/2007 | Barta et al. |
| 7,300,100 B2 | 11/2007 | McLean et al. |
| 7,331,627 B2 * | 2/2008 | Van Den Brink et al. ......................... 296/190.07 |
| 7,338,126 B2 | 3/2008 | Ropp |
| 7,452,019 B1 | 11/2008 | Day |
| 7,478,879 B2 | 1/2009 | Robinson |
| 7,744,149 B2 | 6/2010 | Murray et al. |
| 7,882,914 B2 | 2/2011 | Scheele et al. |
| 7,950,726 B2 | 5/2011 | Brown |
| 7,997,600 B2 | 8/2011 | Haller et al. |
| 8,061,770 B2 | 11/2011 | Houston et al. |
| 8,095,268 B2 | 1/2012 | Parison et al. |
| 8,182,038 B2 | 5/2012 | Haller |
| 8,186,475 B2 | 5/2012 | Sugden et al. |
| 8,225,903 B2 | 7/2012 | Dunn |
| 8,226,163 B1 | 7/2012 | Pearson et al. |
| 8,261,869 B2 | 9/2012 | Turco et al. |
| 8,265,832 B2 | 9/2012 | Haller et al. |
| 2002/0033622 A1 | 3/2002 | Jarnail et al. |
| 2005/0051373 A1 | 3/2005 | Bernhardt et al. |
| 2005/0224269 A1 | 10/2005 | Dahl |
| 2006/0061022 A1 * | 3/2006 | Chang et al. .................. 267/132 |
| 2006/0208401 A1 * | 9/2006 | Reast ........................... 267/37.1 |
| 2006/0237885 A1 | 10/2006 | Paillard et al. |
| 2009/0045000 A1 | 2/2009 | Brown |
| 2009/0205880 A1 | 8/2009 | Hammonds |
| 2009/0284061 A1 | 11/2009 | Maier et al. |
| 2010/0006364 A1 | 1/2010 | Koutsky et al. |
| 2010/0213345 A1 | 8/2010 | Haller |
| 2010/0276211 A1 | 11/2010 | Kolb et al. |
| 2010/0289312 A1 | 11/2010 | Burr et al. |
| 2012/0007293 A1 | 1/2012 | Bauer et al. |
| 2012/0025577 A1 | 2/2012 | Kolb |
| 2012/0032379 A1 | 2/2012 | Kolb |
| 2012/0043798 A1 | 2/2012 | Haller et al. |
| 2012/0049602 A1 | 3/2012 | Kaessner |
| 2012/0133184 A1 | 5/2012 | Himmelhuber |
| 2012/0145875 A1 | 6/2012 | Haller et al. |
| 2013/0069409 A1 | 3/2013 | Kolb |

FOREIGN PATENT DOCUMENTS

| | | |
|---|---|---|
| DE | 1480188 | 3/1970 |
| DE | 2309808 | 9/1973 |
| DE | 2317824 | 10/1973 |
| DE | 7419891 | 10/1974 |
| DE | 2537174 | 8/1975 |
| DE | 7731339 | 1/1978 |
| DE | 2816616 | 10/1979 |
| DE | 141769 | 5/1980 |
| DE | 3208680 | 3/1982 |
| DE | 3517345 | 11/1986 |
| DE | 3890533 | 10/1989 |
| DE | 3901898 | 7/1990 |
| DE | 00009312640 | 1/1994 |
| DE | 19907658 | 2/1999 |
| DE | 19744199 | 4/1999 |
| DE | 19945841 A1 * | 4/2001 |
| DE | 10129127 | 1/2003 |
| DE | 10206223 | 9/2003 |
| DE | 10300876 | 7/2004 |
| DE | 102005028725 | 1/2005 |
| DE | 102005023088 | 6/2006 |
| DE | 102006030008 | 4/2007 |
| DE | 102008063812 | 4/2007 |
| DE | 112006002984 | 10/2008 |
| DE | 102008023120 | 5/2010 |
| EP | 284365 A2 * | 9/1988 |
| EP | 1400398 | 3/2004 |
| EP | 1577156 | 9/2005 |
| EP | 1652724 | 5/2006 |
| FR | 2352686 | 12/1977 |

(56) References Cited

FOREIGN PATENT DOCUMENTS

| | | |
|---|---|---|
| GB | 1401881 | 8/1975 |
| GB | 1432614 | 4/1976 |
| GB | 1587637 | 4/1981 |
| GB | 2438090 | 11/2007 |
| WO | WO 92/04224 | 3/1992 |
| WO | WO 98/32627 | 7/1998 |
| WO | WO 03/063650 | 8/2003 |
| WO | WO 2007/058572 | 5/2007 |

OTHER PUBLICATIONS

Official Action for German Patent Application No. 102010054749.2, mailed on Mar. 16, 2012, 3 pages.

* cited by examiner

SUSPENSION DEVICE FOR VEHICLE SEATS AND/OR VEHICLE CABINS HAVING AN ELASTOMER MEMBER

CROSS REFERENCE TO RELATED APPLICATIONS

This application claims the benefit of German Patent Application No. 10 2010 054 749.2 filed Dec. 15, 2010, the entire disclosure of each of which is incorporated herein by reference.

The invention relates to a suspension device for vehicle seats and/or vehicle cabins for applying a spring force to a vibratory motion of a first component relative to a second component, preferably in the longitudinal and/or the transverse direction of the vehicle, wherein at least one spring member extending in the longitudinal and/or the transverse direction of the vehicle is connected in at least one end region to a first component and in the central region thereof to a second component, according to the preamble of patent claim 1.

Horizontal suspension devices for vehicle seats are known, which include a coil spring that is preferably disposed horizontally in a component in the transverse direction of the vehicle and can move in a vibratory manner relative to a further component. Here, the coil spring is preferably clamped in the component in a central region thereof, whereas the end regions of the coil spring are connected to the further component and can be deflected in the vibration direction of the components and thus transversely or vertically relative to the longitudinal axis of the coil spring.

Such coil springs are subjected both to an extension force and a flexural force in the case of an end-side deflection in a direction extending vertically to the longitudinal axis of the coil spring. Here, the flexural force is more dominant in its effect on the loading of the coil spring than the extension force, as a result of which the flexural force will, after longer periods of use of such suspension devices with coil springs, lead to a deformation of the coil spring and thus to an inadequate functioning of the entire suspension device.

Moreover, due to the high flexural forces acting in the case of strong vibrations with strong vibratory forces, as they may occur for example when cushioning or damping a vibratory motion of an entire vehicle cabin, conventional coil springs can be used only to a limited extent, since their force absorption capacity is limited in the case of high flexural forces acting thereon. Alternatively, a plurality of coil springs could be arranged so as to commonly absorb such flexural forces. However, this would entail a more complex construction of the suspension device.

As a consequence, the present invention is based on the object of providing a suspension device for vehicle seats and/or vehicle cabins for applying a spring force to a vibratory motion of two components, preferably in the longitudinal and/or the transverse direction of the vehicle, which allows the absorption of high flexural forces and which is of a simple design.

The central idea of the invention is that in a suspension device for vehicle seats and/or vehicle cabins, an elongate spring member made from a flexible elastomer material, which is formed to be rod-shaped, is used in order to apply a spring force to a vibratory motion of a first component relative to a second component, preferably in the longitudinal and/or the transverse direction of the vehicle. The elongate spring member made from an elastomer material extends in the longitudinal and/or the transverse direction of the vehicle and is connected in at least one region to the first component and in its central region to the second component.

Such a suspension device is advantageously made from a low-cost material that is easy to handle, namely an elastomer material. This elastomer material may be designed, due to its structuring and the arrangement of various clearance holes or the like, in such a manner that it has different flexural properties for absorbing flexural forces in different regions, i.e. for example in the central and the end regions. This allows an individual formation of the spring member for certain requirements, depending on whether large vibration forces are to be damped or cushioned and whether in the case of low forces, where it is almost exclusively the end region of the elongate spring member that is deflected, a soft or a hard damping or cushioning of the low vibration forces is desired. This can be achieved by means of providing for the elastomer material to be made from a different composition in the end regions to the one in the central region where it comprises for example a harder elastomer material which can absorb, in the case of stronger vibrations, stronger flexural forces or vibration forces of the components.

The central region of the elongate spring member is at least partially clamped by the second component in a clamping region, so that the end regions can move in the vibration direction and the vibratory motion of the components vibrating relative to each other is cushioned or damped.

Preferably, the suspension device includes metal strip members which at least partially extend parallel to each other, which metal strip members are arranged in the longitudinal direction of the spring member within the elastomer material. These metal strip members are permanently integrated in the elastomer material in the course of a vulcanisation production process. By virtue of the composition of the elastomer material between these metal strip members extending at least partially parallel to each other, the absorption of different flexural forces and thus the cushioning of the vibration forces can be influenced. This means the modification of a spring constant of the elongate spring member and thus of the entire spring device in the case of flexural stresses.

Such metal strip members allow a limited amount of flexing of the elongate elastomer element and enable at the same time, upon a rotation of the elastomer material about the longitudinal axis thereof, the elastomer element to experience an intended stiffening, so that any flexural stresses are prevented and any cushioning and damping by the elastomer element is inhibited, since the metal strips are then orientated widthwise in the vibration direction of the components and can thus no longer be flexed.

Preferably, the length of the metal strip members is lower than the length of the entire spring member, so that the end regions of the spring member are made from elastomer regions that are free from any metal strip members. These elastomer regions that are free from any metal strip members allow an elongation of the elastomer in these regions independently of the flexing properties of the metal strip members, which may be formed as spring leaves. As a result, the spring member made from an elastomer material can be used for example for shock absorption, if the elongate spring member or the elastomer member is disposed, turned into a 90° position about its longitudinal axis, in such a manner that the metal strip members face widthwise in the vibratory direction and thus do not allow any flexing in the region of the metal strips. Rather, a deflection or flexing will occur only in the end regions of the elastomer element which are merely used for absorbing vibrations introduced into the vehicle or the vehicle seat and/or the vehicle cabin for the purpose of shock damping, but have no effect on an extensive cushioning of introduced vibrations in order to cushion the vibratory motions.

The metal strip members extend from their central region to their end regions from a parallel position into a diverging position, so that the metal strips are arranged in a bent form with a small distance in the central region and a larger distance in the end-side regions thereof. Advantageously, as a result, a progressive spring characteristic with regard to the force and with regard to the exerted pressure can be achieved, since the elastomer member with the metal members integrated therein has different spring constants in different regions due to the different distances of the metal strip members. The length of the metal strip members determines a spring damper characteristic in its course over the entire spring deflection. This can also be achieved via the shape, the length and the position of recesses and/or bores in the elastomer element and/or the metal strip member.

According to a preferred embodiment, the spring member has a round cross-section in the central region thereof, in order to allow it to be disposed in the clamping region of the second component, which is formed to be complementary thereto, in a manner so as to be rotatable about the longitudinal axis thereof. As a result, the already described rotation about 90° in relation to the longitudinal axis of the spring member is made possible in a simple manner, in order to achieve in this way a locked condition of the elastomer member or the spring member in the case of a 90° position of the metal strip members. However, impact damping or shock damping can still be maintained in this locked position in the end regions of the elastomer member.

The round or circular cross-section of the elastomer member in the central region thereof allows a rotation about the longitudinal axis thereof and at the same time a positive engagement in the component formed as a clasp.

The metal strip members extend widthwise upon a 90° turn about the longitudinal axis thereof in the vibration direction of the components or in the case of a 0° rotary position about the longitudinal axis thereof vertically to the vibration direction of the components. The end regions of the spring member preferably have a distance with a square cross-section, i.e. the end regions may be formed to be square or cuboid. This facilitates the fastening of these end regions or at least of one of these end regions to the further component.

The metal strip members are made from a material that ensures rigidity in the transverse direction thereof and flexibility vertically to the transverse direction thereof.

Further advantageous embodiments will become evident from the dependent claims.

Figure 2A:
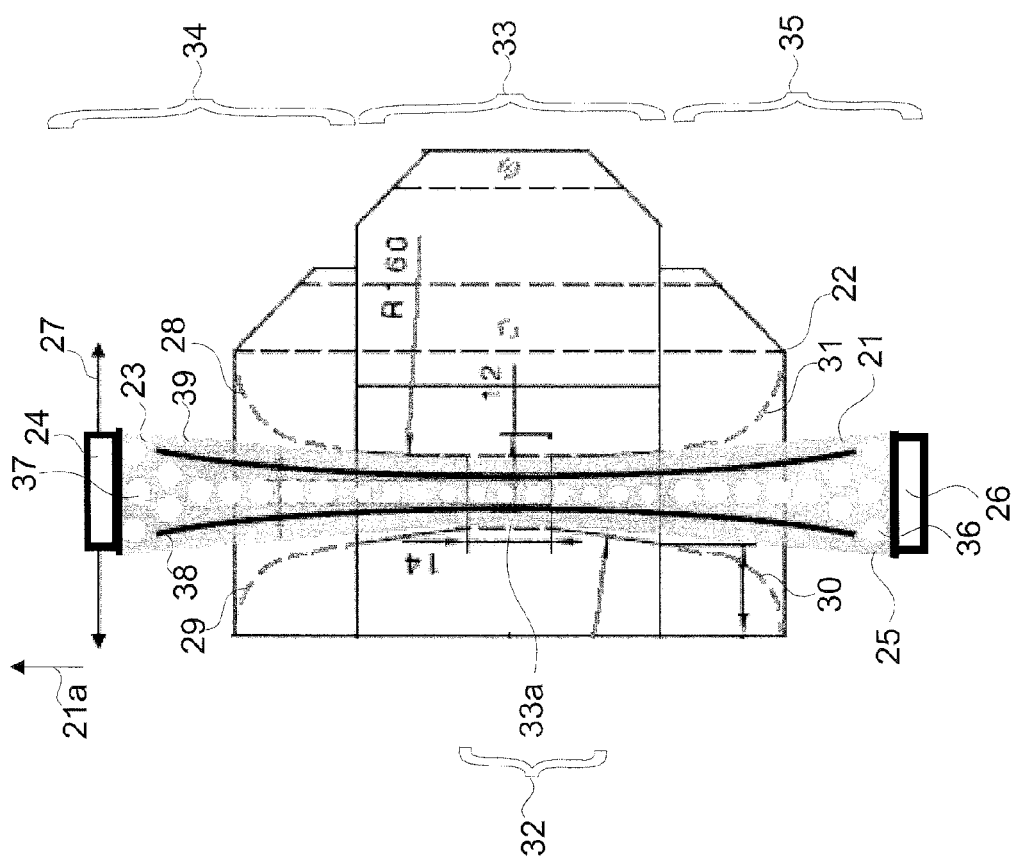
Figure 2B:
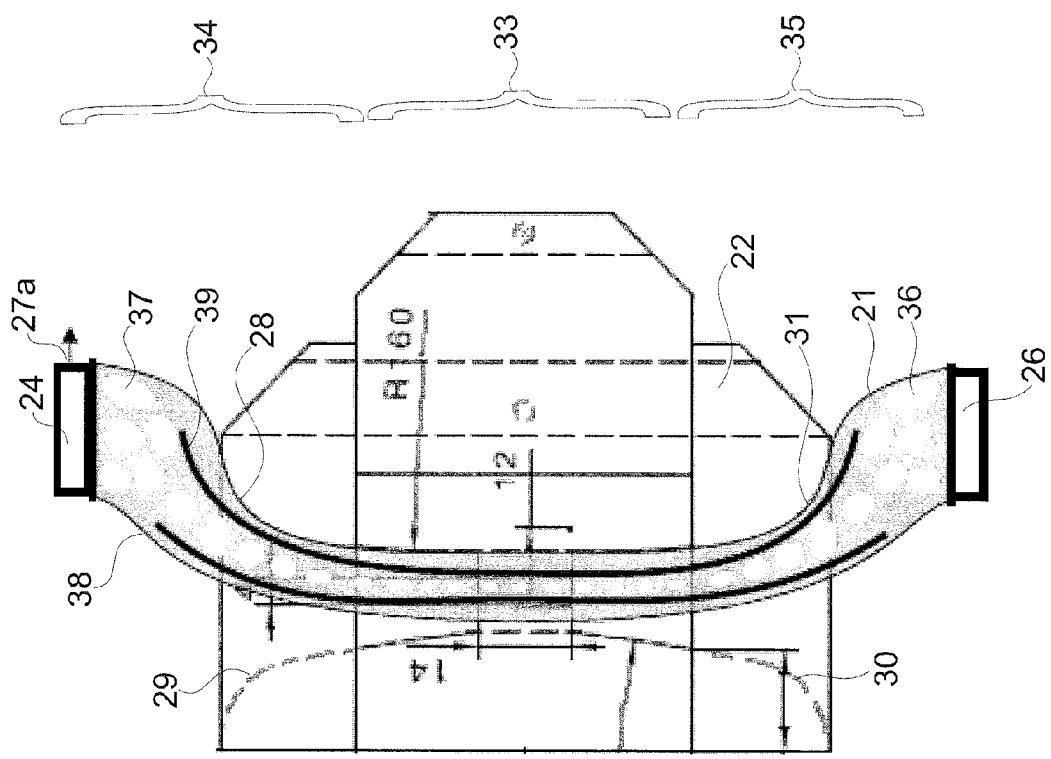
Figure 3B:
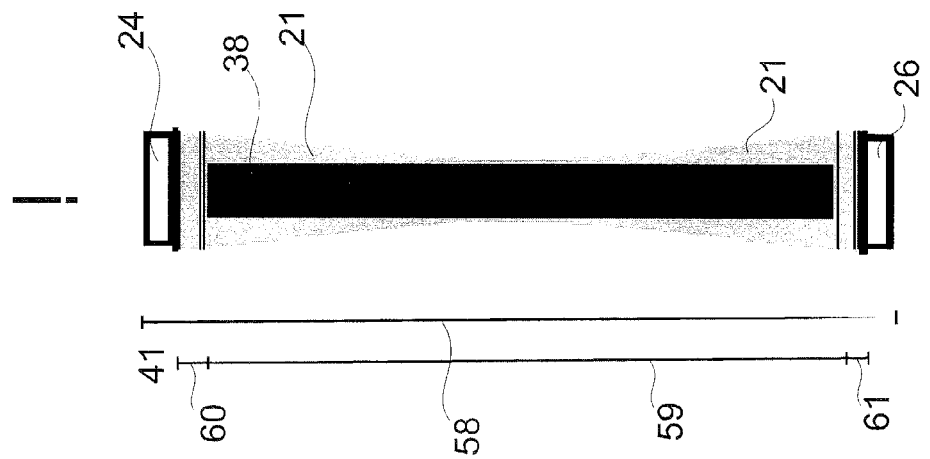
Figure 3A:
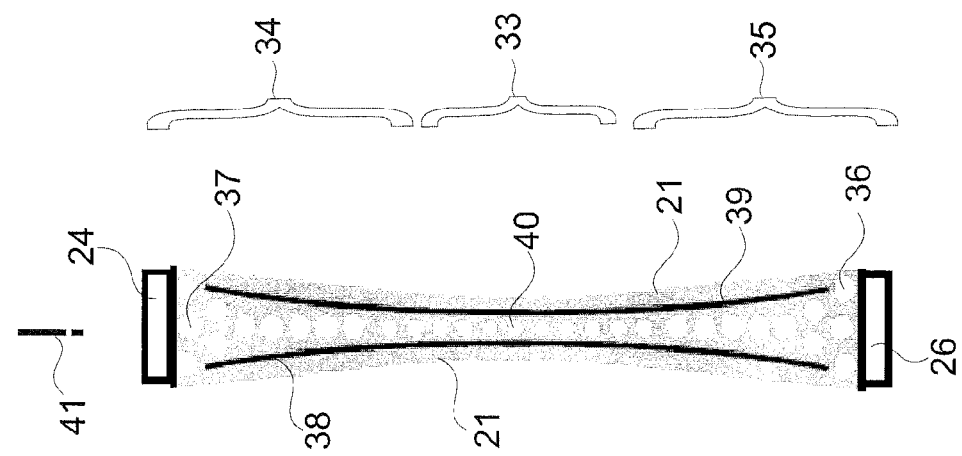
Figure 4A:
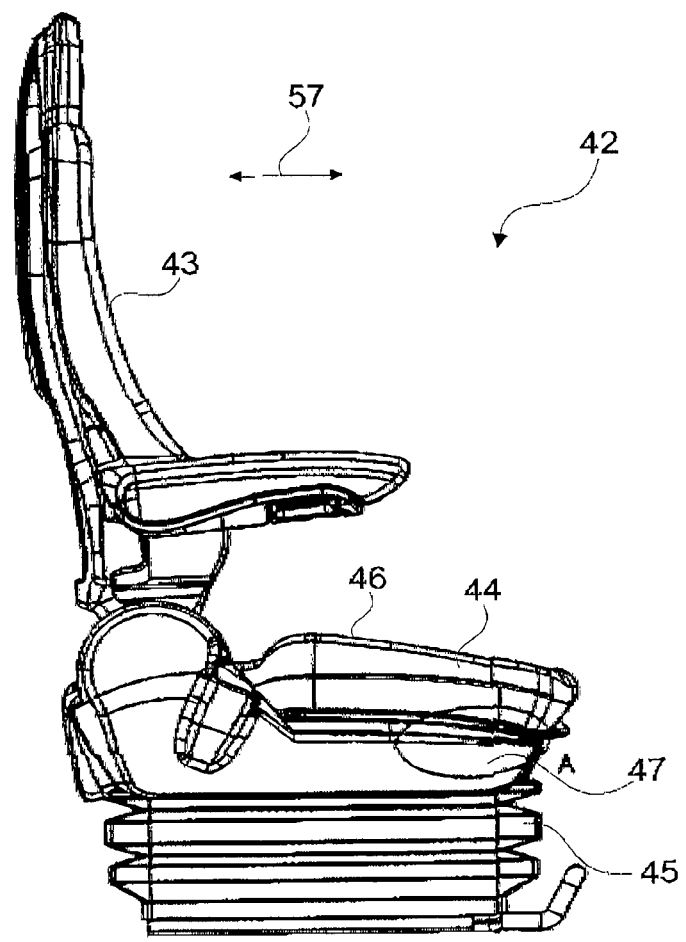
Figure 4B:
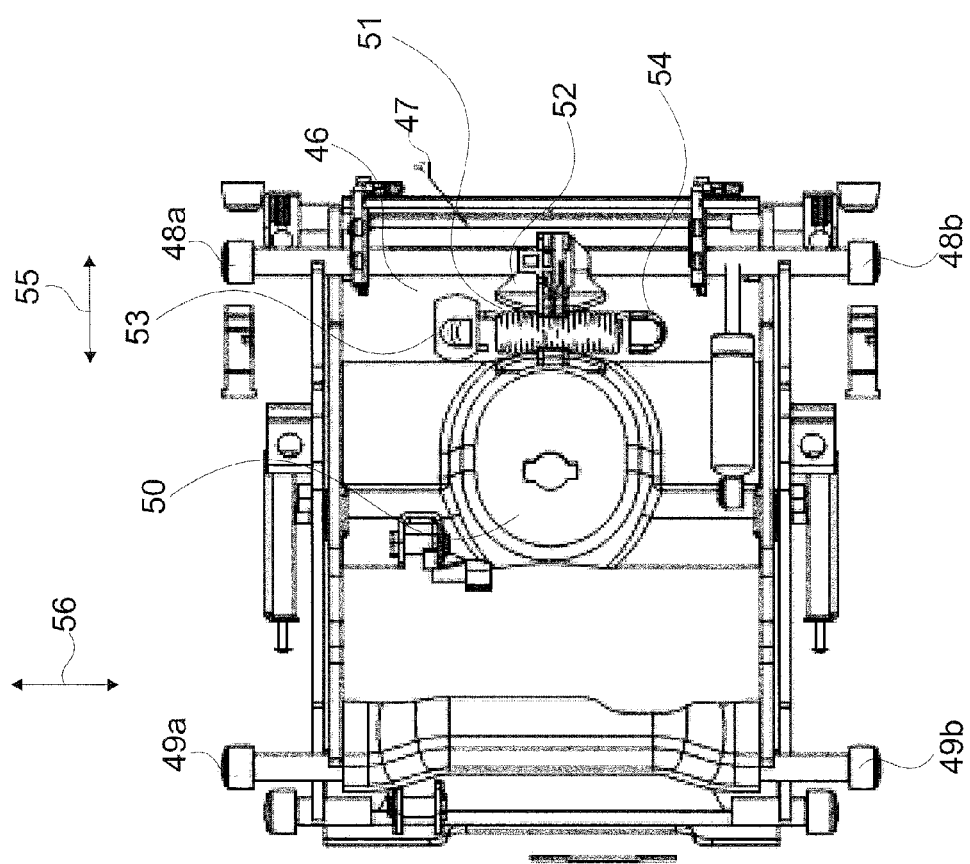

Advantages and expediencies can be seen from the following description in connection with the drawings, wherein:

FIG. 1 shows a schematic top view of a suspension device according to the prior art;

FIGS. 2a and 2b respectively show a schematic sectional view of an embodiment of the invention in a resting position and in a deflected or deformed condition of the suspension device according to the invention;

FIGS. 3a and 3b respectively show a schematic view of the spring member for the suspension device according to the invention in a 0° and in a 90° rotary position; and FIGS. 4a and 4b show a vehicle seat with a suspension device indicated therein according to the embodiment of the invention, in a possible position.

FIG. 1 shows a schematic view of the suspension device according to the prior art. It can be seen from this view that a coil spring 1 is clamped in a component 2 in the central region 13 thereof.

An end region 3 with a fastening member 4, as well as a further end region 5 with a fastening member 6, of the coil spring are here connected to a component that is not shown in any more detail, which component carries out a vibratory motion relative to component 2 in the direction of double arrow 7.

As a result of a vibratory motion of the components relative to each other in the direction 7, end regions 14, 15 of the coil spring are extended to such a degree that they come to bear against curved paths 8, 9, 10 and 11 of the component 2, and at the same time the central region is retained within a clamping region 12.

FIGS. 2a and 2b illustrate the suspension device according to an embodiment of the invention in a schematic view. This illustration is a top view if a vibratory motion 27 occurs in the longitudinal direction of the vehicle and in the transverse direction of the vehicle, and thus a spring member 21 is orientated in a horizontal direction in the case of a horizontally orientated vehicle.

The spring member 21 is made from an elastomer material and is clamped within a second component 22 in the central region 33 thereof. To this end, the component 22 has a clamping region 32, in which the spring member or the elastomer member 21 preferably has a circular cross-section, which by the way is also the case with the region of component 22 that is formed in a complementary manner.

The elastomer member or spring member 21 is formed in the centre thereof with a small diameter or with small outer dimensional distances and in the end regions 34, 35 thereof with larger distances or diameters. The elastomer member preferably has clearance openings or openings that extend into the material, for example in the form of bores, which are indicated by reference numerals 37 and 36. These openings may be formed to be larger in the end regions 35, 34 and to be smaller in the central region 33. This has a different effect on a spring constant of the elastomer element and thus of the spring member 21.

In addition, the elastomer member of the spring member 21 includes metal strip members 38, 39 that were integrated therein during the vulcanisation process, which metal strip members extend almost parallel to each other in the central region 33. In the end regions 34, 35 however they diverge, as can be seen in the drawing. The width directions of these metal strip members 38, 39 extend parallel to each other.

In the case of an introduced vibratory motion in the direction of double arrow 27, the tapered elastomer or spring member 21 can come to bear against the contours 28, 29, 30, 31 of the second component 22. To this end a first component, which is not shown here in any more detail, is moved relative to the second component 22 in the direction 27, with the first component being attached to sections 24, 26 having a square cross-section in the end-side regions 23 and 25 of the elastomer member. Thus, a horizontal vibration of the preferably horizontally orientated elastomer member 21 preferably occurs in such a way that the ends 23, 25 thereof vibrate in the direction of the vibratory motion 27, the vibrations of which are to be cushioned or damped.

The metal strips 38, 39 extend in the longitudinal direction of the elastomer member 21, as is indicated by reference sign 21a, and due to the flexing of the metal strips 38 and 39, this is approximately in the longitudinal direction.

In the central region 33a of the elastomer member, the already mentioned circular cut-out for rotating the elastomer member about the longitudinal axis thereof is located.

FIG. 2b shows the suspension device according to the invention in a deformed or deflected position, whereas FIG. 2a shows the suspension device in a resting position.

It can be seen from a comparison of the two FIGS. 2a and 2b that in the case of such a deflected or deformed position of the elastomer member 21, a bearing against the contours 28, 31 occurs, if a vibratory motion of a first component (not shown here) occurs in the direction of arrow 27a relative to the second component 22. During such a deformation movement, the metal strip members 38 and 39 are, if viewed in the image plane, also deformed towards the right and act against a flexing force in the direction of arrow 27a.

The end regions 23, 25 will adopt a different deformation to those regions in which the metal strip members 38, 39 are arranged within the elastomer member.

FIGS. 3a and 3b show a further schematic view of the elastomer member that can be used for the invention in conjunction with this suspension device. In FIG. 3a, the elastomer member or spring member 21 is located in a 0° rotary position. In FIG. 3b, however, the elastomer member 21 is shown rotated by 90° about the longitudinal axis 41 thereof. This corresponds to a locking condition since the metal strip members 38, 39 extend widthwise in the vibration direction 27 and can therefore not be bent.

In the position according to FIG. 3a, however, the metal strip members 38, 39 are arranged in such a way that they extend widthwise transversely to the vibration direction 27, so that a flexing as shown in FIG. 2b becomes possible.

As a result of the locking position shown in FIG. 3b, the elastomer member only has the effect of a rubber buffer, as soon as the metal strips 38, 39 allow it. Additional impact damping is provided by the end regions 60, 61, which are free from any metal strip members and therefore allow vibrations to be absorbed and these introduced vibrations to be damped or cushioned despite the locking position of the metal strip members. To this end, the metal strip members 38, 39 are provided with a length 59 that is smaller than the overall length 58 of the entire elastomer member.

FIGS. 4a and 4b show a vehicle seat with a possible positioning of the suspension device according to the invention. The vehicle seat 42 is shown in a lateral view having a back rest 43 and a seat part 44 and can respond in a cushioning or vibration-reducing manner both to introduced vibrations in the longitudinal directions 57, 55 of the vehicle and to introduced vibrations in the transverse direction 56 of the vehicle.

Bellows 45 are provided between the top seat part and a bottom seat part 46, in which bellows shear arms for moving the vehicle seat upwards and downwards as well as further details shown in the top view of FIG. 4b are arranged. For example, a cut-out of the overall design according to FIG. 4b is provided in section 47, in which cut-out the spring member 51 is disposed. The reason is that the spring member 51 is arranged in a vibratory manner between a first component 46, on which these end regions 53 and 54 are mounted with fastening members of the elastomer member 51, and a second component 52 in such a way that the ends 53 and 54, if viewed in the image plane, are pivoted towards the left and the right during a vibratory motion of the two components according to arrow 55.

An air spring 50 is used for an upward and downward cushioning of the vehicle seat.

In addition, roller bearings 49a, 49b, 48a, 48b are arranged in the end regions of scissors arms for moving the vehicle seat upwards and downwards. The second component 52 may for example be mounted on one of the pivot axes with the roller bearings 48a, 48b of the scissors arms.

All of the features disclosed in the application documents are claimed as being essential to the invention in as far as they are novel over the prior art either individually or in combination.

LIST OF REFERENCE NUMERALS

1 Coil spring
2 Component
3 End region
4 Fastening member
5 End region
6 Fastening member
7 Double arrow
8 Curved paths
9 Curved paths
10 Curved paths
11 Curved paths
13 Central region
14 End region
15 End region
21 Elongate spring member
21a Longitudinal direction
22 Second component
23 End region
24 Sections
25 End region
26 Sections
27 Vibratory motion
27a Vibratory motion
28 Contours
29 Contours
30 Contours
31 Contours
32 Clamping region
33 Central region
33a Central region of the elastomer member
34 End regions
35 End regions
36 Bores
37 Bores
38 Metal strip members
39 Metal strip members
41 Longitudinal axis
42 Vehicle seat
43 Back rests
44 Seat part
45 Bellows
46 Top seat part
47 Section
50 Air spring
51 Spring member
52 Second component
53 End portion
54 End portion
55 Vibratory motion
56 Longitudinal and/or transverse direction of the vehicle
57 Longitudinal and/or transverse direction of the vehicle
58 Overall length
59 Length
60 End sections
61 End sections

The invention claimed is:

1. A suspension device for vehicle seats and/or vehicle cabins for applying a spring force to a vibratory motion of a first component relative to a second component, in a longitudinal or transverse direction of a vehicle, wherein at least one elongate spring member extending in the longitudinal or transverse direction of the vehicle is connected at a first end and at a second end to the first component and in a central region thereof to the second component, wherein the elongate spring member is made from a flexible elastomer material that is formed to be rod-shaped, and wherein at least two metal strip members that at least partially extend parallel to each other are arranged in a longitudinal direction of the spring member within the elastomer material and/or adjacent thereto, wherein the elongate spring member is rotatable about a longitudinal axis thereof, wherein a first rotary position of the elongate spring member has a first deformation characteristic, wherein a second rotary position of the elongate spring member has a second deformation characteristic.

2. The suspension device as claimed in claim 1, wherein the central region of the elongate spring member is at least partially clamped by the second component in a clamping region.

3. The suspension device as claimed in claim 1, wherein the length of the at least two metal strip members is smaller than the length of the entire spring member, so that elastomer regions that are free from any of the at least two metal strip members exist in the at least one end region of the spring member.

4. The suspension device as claimed in claim 1, wherein the at least two metal strip members extend from a parallel position and diverge towards the at least one end region thereof.

5. The suspension device as claimed in claim 1, wherein the spring member has a round cross-section in the central region thereof so as to enable it to be mounted in a rotatable manner about the longitudinal axis thereof in a clamping region of the second component formed to be complementary thereto.

6. The suspension device as claimed in claim 5, wherein metal strip members extend widthwise in the second rotary position about the longitudinal axis thereof in a vibration direction of the components in a locked position.

7. The suspension device as claimed in claim 6, wherein the metal strip members extend widthwise in the first rotary position about the longitudinal axis thereof vertically to the vibration direction of the components.

8. The suspension device as claimed in claim 1, wherein the at least one end region of the spring member include a section having a square or rectangular cross-section.

9. The suspension device as claimed in claim 7, wherein the metal strip members are rigid in a width direction thereof and are flexible vertically to a lateral direction.

10. A suspension device for vehicle seats and/or vehicle cabins for applying a spring force to a vibratory motion of a first component relative to a second component, in a longitudinal and/or transverse direction of a vehicle, wherein at least one elongate spring member extending in the longitudinal or transverse direction of the vehicle is connected at a first end and at a second end to the first component and in a central region thereof to the second component, wherein the elongate spring member is made from a flexible elastomer material that is formed to be rod-shaped, and the elongate spring member is formed in the central region with a smaller diameter than in the first end and the second end, wherein the elongate spring member is rotatable about a longitudinal axis thereof, wherein a first rotary position of the elongater spring member has a first deformation characteristic, wherein a second rotary position of the elongate spring member has a second deformation characteristic.

* * * * *